United States Patent [19]
Glover

[11] 3,809,412
[45] May 7, 1974

[54] PIPE COUPLINGS

[75] Inventor: John Benjamin Glover, Stocksbridge, England

[73] Assignee: The Hepworth Iron Company Limited, Sheffield, England

[22] Filed: Jan. 17, 1972

[21] Appl. No.: 218,326

[30] Foreign Application Priority Data
Jan. 21, 1971  Great Britain................... 2835/71

[52] U.S. Cl. ............... 285/110, 285/230, 285/237, 285/260, 285/DIG. 16, 285/DIG. 19, 285/DIG. 22
[51] Int. Cl. ........................................... F16l 17/00
[58] Field of Search ........... 285/110, 111, 230, 237, 285/288, 291, 423, DIG. 22, 260, DIG. 16

[56] References Cited
UNITED STATES PATENTS

| | | | |
|---|---|---|---|
| 2,366,067 | 12/1944 | Smith | 285/260 X |
| 3,640,552 | 2/1972 | Demler et al. | 285/DIG. 22 X |
| 2,889,582 | 6/1959 | Cooper | 285/291 X |
| 3,217,077 | 11/1965 | Cocke | 285/288 X |
| 3,308,998 | 3/1967 | Oppasser et al. | 285/DIG. 22 X |

FOREIGN PATENTS OR APPLICATIONS

| | | | |
|---|---|---|---|
| 1,014,803 | 8/1957 | Germany | 285/DIG. 16 |
| 829,761 | 12/1969 | Canada | 285/288 |
| 190,251 | 6/1964 | Sweden | 285/288 |

Primary Examiner—Mervin Stein
Assistant Examiner—David H. Corbin
Attorney, Agent, or Firm—Lowe, King and Price

[57] ABSTRACT

A pipe coupling for plain-end pipes, e.g., of fired clayware, comprises a pair of sleeves of resilient plastics material with cylindrical portions for securing on the pipe-ends and generally cylindrical joint forming portions adapted to extend beyond the pipe-ends, the joint forming portion of at least one of the sleeves, but preferably of each of the sleeves, being connected to its securing portion by an annular portion for abutting a pipe-end, and sealing means, such as mating tapers, a sealing lip, or a sealing ring, being provided between the joint forming portions, whereby the securing portions can yield to the profiles and diameters of the respective pipe-ends to which they are applied, while the joint forming portions substantially retain their generally cylindrical shapes, so that little tolerance need be allowed for in the sealing means.

7 Claims, 6 Drawing Figures

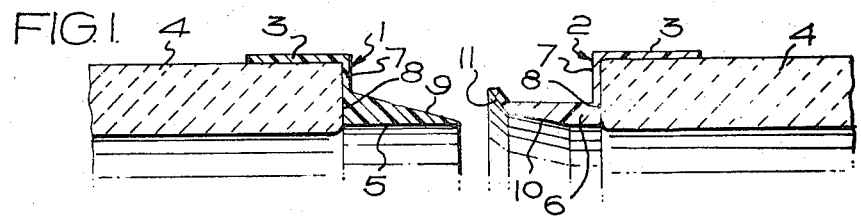
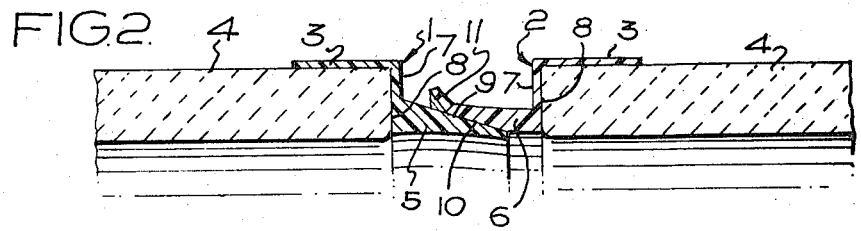
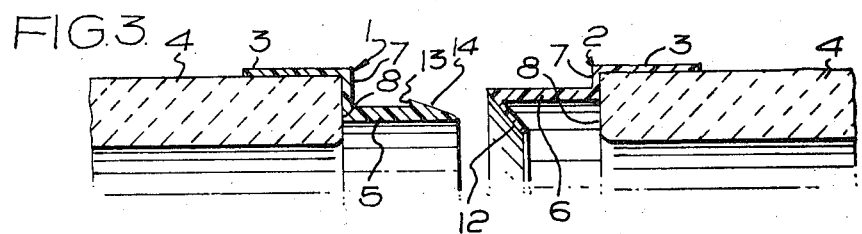
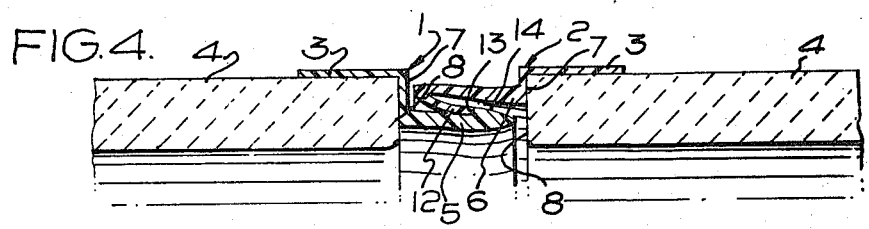
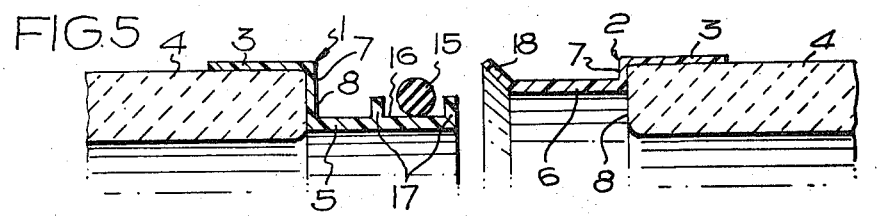
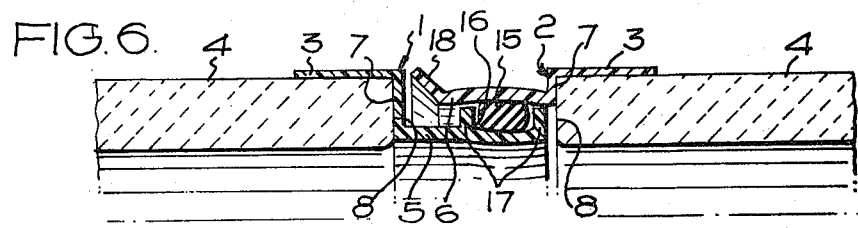

PIPE COUPLINGS

This invention relates to pipe couplings, more particularly for connecting plain-end (i.e., non-socketed) pipes, which may be of fired clayware or of asbestos-cement, pitch-fibre, or concrete, such as are used for sewers drains and cable conduit, and has for its object the provision of a pipe coupling capable of accommodating the appreciable tolerances on nominal diameter and irregularity of profile, e.g., ovality, encountered with fired clayware pipes, yet keeping within the overall diameter of the pipes.

According to the present invention, a pipe coupling for connecting plain-end pipes comprises a pair of sleeves of resilient plastics material, each sleeve having a cylindrical portion for securing on one end of a plain-end pipe and a generally cylindrical joint forming portion adapted to extend beyond the pipe-end, and the joint forming portion of at least one of the sleeves being connected to its securing portion by an annular portion for abutting a pipe-end, together with sealing means between the joint forming portions of the two sleeves.

The securing portions yield to the profiles and diameters of the respective pipe-ends to which they are secured, while the joint forming portions substantially retain their generally cylindrical shapes, so that little tolerance need be allowed for in the sealing means between the joint forming portions of the two sleeves and the overall diameter of the joint exceeds the outside diameter of the pipes by substantially no more than twice the thickness of the securing portions of the sleeves.

The abutting of the annular portion of the one sleeve against a pipe-end affords positive location on the pipe-end, and the other sleeve preferably also has an annular portion for abutting likewise against a pipe-end.

The sealing means may comprise external and internal respective taper portions on the joint forming portions of the sleeve, in which case the annular portions may have a radial extent such as will bring the joint forming portions close to the inner surfaces of pipes to which the sleeves are secured through their securing portions on the outer surfaces of the pipes.

Alternatively, the sealing means may comprise a lip on the free end of the joint forming portion of one sleeve and adapted to make sealing engagement with the joint forming portion of the other sleeve, in which case the inner joint forming portion may be connected to its respective securing portion by an annular portion of such an extent that the joint forming portion will be brought close to the inner surface of a pipe to which the sleeve is secured through its securing portion on the outer surface of the pipe. The sealing lip is preferably an inturned lip on the outer joint forming portion, so that pressure from inside the joint will tend to press the lip into firmer sealing contact with the inner joint forming portion.

Again, the sealing means may comprise a resilient sealing ring compressed between the joint forming portion, the sealing ring preferably being housed in a groove on the outside of the inner joint forming portion, which groove is preferably formed by a pair of circumferential flanges one of which is at the free end of the inner joint forming portion, and the free end of the outer joint forming portion preferably being flared to provide a lead-in taper for effecting compression of the sealing ring in assembling the joint. As with the lip previously mentioned, this form of sealing means may also allow for appreciable draw between connected pipes.

The securing portions, and preferably the annular portions also, may be thinner than the remainder of the sleeves, to afford greater flexibility for accommodating themselves to pipe-ends to which they are applied, but in any case they are preferably secured both by being a force fit on the pipe-ends and by the application of adhesive, which may extend also between the annular portions and the pipe-ends. The adhesive may be applied to the insides of the securing portions during manufacture of the sleeves, the adhesive being of the type capable of being reactivated by slight heat or application of a solvent or actuator prior to application of the sleeves to pipes on site. If the sleeves are intended to be applied to pipes having slightly bevelled or rounded pipe-ends, the sleeves may be provided with matching bevelled or rounded portions between the securing portions and the respective annular portions.

Reduction of pipe-ends by an amount up to the thickness of the securing portions of the sleeves is not precluded, but, as mentioned previously, the overall diameter of the joint will exceed the outside diameter of the pipes by substantially no more than twice the thickness of the securing portions of the sleeves if the pipe-ends are not reduced.

Examples of the three principal embodiments will now be described in detail with reference to the accompanying drawings, in which:

FIG. 1 is a fragmentary view showing a pair of coupling sleeves according to the invention in longitudinal section on plain-end pipes and about to be moved into sealing engagement with each other;

FIG. 2 is a similar view with the coupling sleeves in sealing engagement with each other; and FIGS. 3 and 4 and FIGS. 5 and 6 correspond to FIGS. 1 and 2 respectively, but show two other pairs of coupling sleeves according to the invention.

In all the pairs of Figures a pipe coupling comprises a pair of sleeves 1, 2 of resilient plastics material, having cylindrical portions 3 for securing on the ends of plain-end fired clayware pipes 4 and generally cylindrical joint forming portions 5, 6 respectively, the joint forming portions being connected to the securing portions by annular portions 7 abutting the pipe-ends 8. The securing portions 3 and the annular portions 7 are thinner than the generally cylindrical joint forming portions 5, 6 to afford great flexibility to the securing portions for yielding to the profiles and diameters of the respective pipe-ends and thereby accommodating the appreciable tolerances on nominal diameter and irregularity of profile encountered, while the joint forming portions 5, 6 substantially retain their generally cylindrical shapes, so that little tolerance need be allowed for in the various sealing means presently to be described with reference to the respective pairs of Figures. The securing portions 3 are preferably secured both by being a force fit on the pipe-ends and by the application of adhesive, which may extend also between the annular portions 7 and the pipe-ends 8.

In FIGS. 1 and 2, the sealing means comprises external and internal respective taper portions 9, 10 on the joint forming portions 5, 6 respectively, and the outer joint forming portion 6 also has a flared end 11 affording a larger lead-in for the inner joint forming portion 5.

In FIGS. 3 and 4, the sealing means comprises an inturned lip 12 on the outer joint forming portion 6 engaging the inner joint forming portion 5 behind a shoulder 13, which has an external taper 14 to assist the fitting of the lip over the shoulder.

In FIGS. 5 and 6, the sealing means is a resilient sealing ring 15 compressed between the joint forming portions 5, 6 and housed in a groove 16 on the outside of the inner joint forming portion 5, the groove being formed by a pair of circumferential flanges 17, and the free end 18 of the outer joint forming portion 6 being flared to provide a lead-in taper for effecting compression of the sealing ring 15 in assembling the joint.

The sealing means of FIGS. 3 and 4 or of FIGS. 5 and 6 allows for appreciable draw between the connected pipes 4.

What I claim is:

1. A pipe coupling for joining plain-end pipes comprising a pair of sleeves of resilient plastic material, each sleeve having a cylindrical portion for securing on the external surface of the pipe end, each sleeve further including an annular disc portion having a radial thickness less than the radial thickness of the pipe end, and extending radially inwardly from said cylindrical securing portion for abutting one end of a plain-end pipe, and a generally cylindrical joint forming portion extending generally axially from the inner periphery of the annular disc portion to enable the joint forming portions to be joined, the outer diameter of each of said cylindrical joint forming portions being less than the inner diameter of the respective securing portions, said outer diameters differing from each other and the radial thickness of the respective disc portions differing from each other, to enable one joint forming portion to fit inside the other, and one of the joint forming portions being provided with an integral lip adapted to face the other joint forming portion and means on the other joint forming portion for making sealing engagement with said integral lip.

2. A pipe coupling as in claim 1, wherein the integral lip is an inturned lip on the outer joint forming portion.

3. A pipe coupling as in claim 2, wherein said means comprises an annular shoulder behind which the inturned lip on the outer joint forming portion engages when moved into sealing engagement.

4. The pipe coupling of claim 3, wherein said means further includes taper means extending axially and radially inward from said shoulder to assist fitting of the lip over the shoulder.

5. A pipe as in claim 1, wherein the insides of the securing portions are coated with adhesive of the type capable of being reactivated prior to application of the sleeves to pipes on site.

6. The pipe coupling as in claim 1 wherein said cylindrical securing portions and said generally cylindrical joint forming portions are characterized by radial wall thickness, the wall thickness of each securing portions being less than the wall thickness of said joint forming portions.

7. The pipe coupling as in claim 6 wherein said annular disc portion has an axial wall thickness which is less than the radial wall thickness of said joint forming portions.

* * * * *